United States Patent
Bavi et al.

(10) Patent No.: US 11,153,215 B1
(45) Date of Patent: Oct. 19, 2021

(54) ASYNCHRONOUS HIGH THROUGHPUT INBOUND MESSAGES WITH THROTTLED OUTBOUND MESSAGES TO SAFEGUARD ENTERPRISE BACKEND SYSTEMS

(71) Applicant: CVS Pharmacy, Inc., Woonsocket, RI (US)

(72) Inventors: Subhash Bavi, Glendale, AZ (US); Dharmendra Gudimetla, Fountain Hills, AZ (US); Sai Kumar Reddy Kotha Venkata, Vernon Hills, IL (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

(21) Appl. No.: 16/195,572

(22) Filed: Nov. 19, 2018

(51) Int. Cl.
| | | |
|---|---|---|
| H04L 12/853 | (2013.01) | |
| H04L 12/819 | (2013.01) | |
| H04L 29/08 | (2006.01) | |
| H04L 12/58 | (2006.01) | |
| H04L 12/815 | (2013.01) | |

(52) U.S. Cl.
CPC .......... *H04L 47/2416* (2013.01); *H04L 47/21* (2013.01); *H04L 47/22* (2013.01); *H04L 51/30* (2013.01); *H04L 67/26* (2013.01)

(58) Field of Classification Search
CPC ..... H04L 47/2416; H04L 47/21; H04L 47/22; H04L 51/30; H04L 67/26
See application file for complete search history.

(56) References Cited

U.S. PATENT DOCUMENTS

| | | | | |
|---|---|---|---|---|
| 6,058,389 | A  * | 5/2000 | Chandra | G06F 16/252 |
| 6,401,160 | B1 * | 6/2002 | See | G06F 12/0223 |
| | | | | 711/103 |
| 8,239,622 | B2 * | 8/2012 | Hetzler | G06F 3/0605 |
| | | | | 711/114 |
| 8,261,286 | B1 * | 9/2012 | Fateev | G06F 9/546 |
| | | | | 709/203 |
| 8,837,695 | B1 * | 9/2014 | Croak | H04L 41/0663 |
| | | | | 370/352 |
| 10,001,939 | B1 * | 6/2018 | Gangadhar | G06F 11/20 |
| 10,225,158 | B1 * | 3/2019 | Lu | H04L 67/1097 |
| 10,362,131 | B1 * | 7/2019 | Robbins | H04L 67/1095 |
| 2001/0055303 | A1 * | 12/2001 | Horton | H04L 41/12 |
| | | | | 370/389 |
| 2005/0157646 | A1 * | 7/2005 | Addagatla | H04L 47/10 |
| | | | | 370/232 |
| 2008/0028068 | A1 * | 1/2008 | Nochta | H04W 28/08 |
| | | | | 709/224 |
| 2009/0064182 | A1 * | 3/2009 | Holar | G06F 9/542 |
| | | | | 719/314 |
| 2010/0093441 | A1 * | 4/2010 | Rajaraman | H04L 67/2823 |
| | | | | 463/42 |

(Continued)

FOREIGN PATENT DOCUMENTS

JP          3468359 B2 * 11/2003

*Primary Examiner* — John A Follansbee
*Assistant Examiner* — Fadi Haj Said
(74) *Attorney, Agent, or Firm* — Patent Law Works LLP

(57) ABSTRACT

An enterprise backend system may have inherent limits on a throughput of inbound messages. In one implementation, a message producer publishes messages to a message broker at a high throughput. A message consumer receives messages from the broker and throttles the throughput of messages shipped to an enterprise backend system.

6 Claims, 4 Drawing Sheets

(56) References Cited

U.S. PATENT DOCUMENTS

| | | | |
|---|---|---|---|
| 2010/0107176 A1* | 4/2010 | Kessler | G06F 9/546 719/314 |
| 2010/0251262 A1* | 9/2010 | Rokicki | G06F 9/546 719/314 |
| 2010/0333111 A1* | 12/2010 | Kothamasu | H04L 51/14 719/313 |
| 2012/0102290 A1* | 4/2012 | Bargoti | G06F 3/0607 711/170 |
| 2012/0303791 A1* | 11/2012 | Calder | H04L 67/1002 709/224 |
| 2013/0066977 A1* | 3/2013 | Katti | H04L 51/26 709/206 |
| 2013/0086340 A1* | 4/2013 | Fleming | H04L 69/40 711/161 |
| 2013/0332415 A1* | 12/2013 | Frerking | G06F 16/178 707/613 |
| 2014/0006626 A1* | 1/2014 | Breiter | H04L 41/0806 709/226 |
| 2014/0156707 A1* | 6/2014 | Sax | G06F 9/5066 707/798 |
| 2016/0055192 A1* | 2/2016 | Bensberg | G06F 16/2282 707/755 |
| 2016/0149773 A1* | 5/2016 | Moscovici | H04L 69/321 714/4.12 |
| 2016/0203102 A1* | 7/2016 | Meng | G06F 16/2255 709/212 |
| 2016/0315808 A1* | 10/2016 | Saavedra | H04L 47/24 |
| 2017/0131936 A1* | 5/2017 | Parra | H04L 47/38 |
| 2017/0228253 A1* | 8/2017 | Layman | G06F 9/4887 |
| 2017/0373960 A1* | 12/2017 | Sachdev | H04L 43/10 |
| 2018/0232308 A1* | 8/2018 | Kusters | G06F 3/0683 |
| 2018/0254892 A1* | 9/2018 | Egorov | H04L 9/14 |
| 2018/0373668 A1* | 12/2018 | Shanley | G06F 13/4226 |
| 2019/0013992 A1* | 1/2019 | Schuhart | H04L 12/1859 |
| 2019/0102266 A1* | 4/2019 | Park | G06F 11/1658 |
| 2019/0370263 A1* | 12/2019 | Nucci | G06F 16/258 |

* cited by examiner

ASYNCHRONOUS HIGH THROUGHPUT INBOUND MESSAGES WITH THROTTLED OUTBOUND MESSAGES TO SAFEGUARD ENTERPRISE BACKEND SYSTEMS

TECHNICAL FIELD

Embodiments of the disclosure are generally related to handling streams of messages provided to an enterprise backend system. More particularly, embodiments of the disclosure are related to throttling a flow of messages provided to an enterprise backend system to safeguard the backend enterprise system from peak message loads.

BACKGROUND

Many web applications and web services generate a real time message stream that is processed by an enterprise backend system. Consequently, the enterprise backend system receives message requests to be processed. However, there may be periods of time in which there is peak inbound message traffic. For example, coupons (or other discount offers) may have campaigns that run on peak hours. As a result, there is a possibility of a potential bottleneck in which the real time message traffic exceeds the capabilities of the enterprise backend system.

One way to deal with high peak inbound message traffic to an enterprise backend system is to upgrade backend infrastructure to handle peak inbound message traffic. However, this may increase infrastructure cost or require changes to legacy systems.

Embodiments of the present disclosure were developed in view of the above-described problems.

SUMMARY

An apparatus, system, and method are disclosed to receive a high throughput message stream and throttle the flow of the message to safeguard an enterprise backend system from a peak period of message traffic. In one embodiment, a message producer asynchronously publishes message traffic to a fault tolerant message broker. In one embodiment, a message consumer receives the message traffic from the message broker and accumulates message traffic in message buckets. The message buckets have a maximum storage size and a bucket is ready for transport when it is filled to a threshold storage size value. In one embodiment, ready buckets are monitored and their contents shipped at a rate selected based on the capabilities of an enterprise backend system.

DETAILED DESCRIPTION

Figure 1:
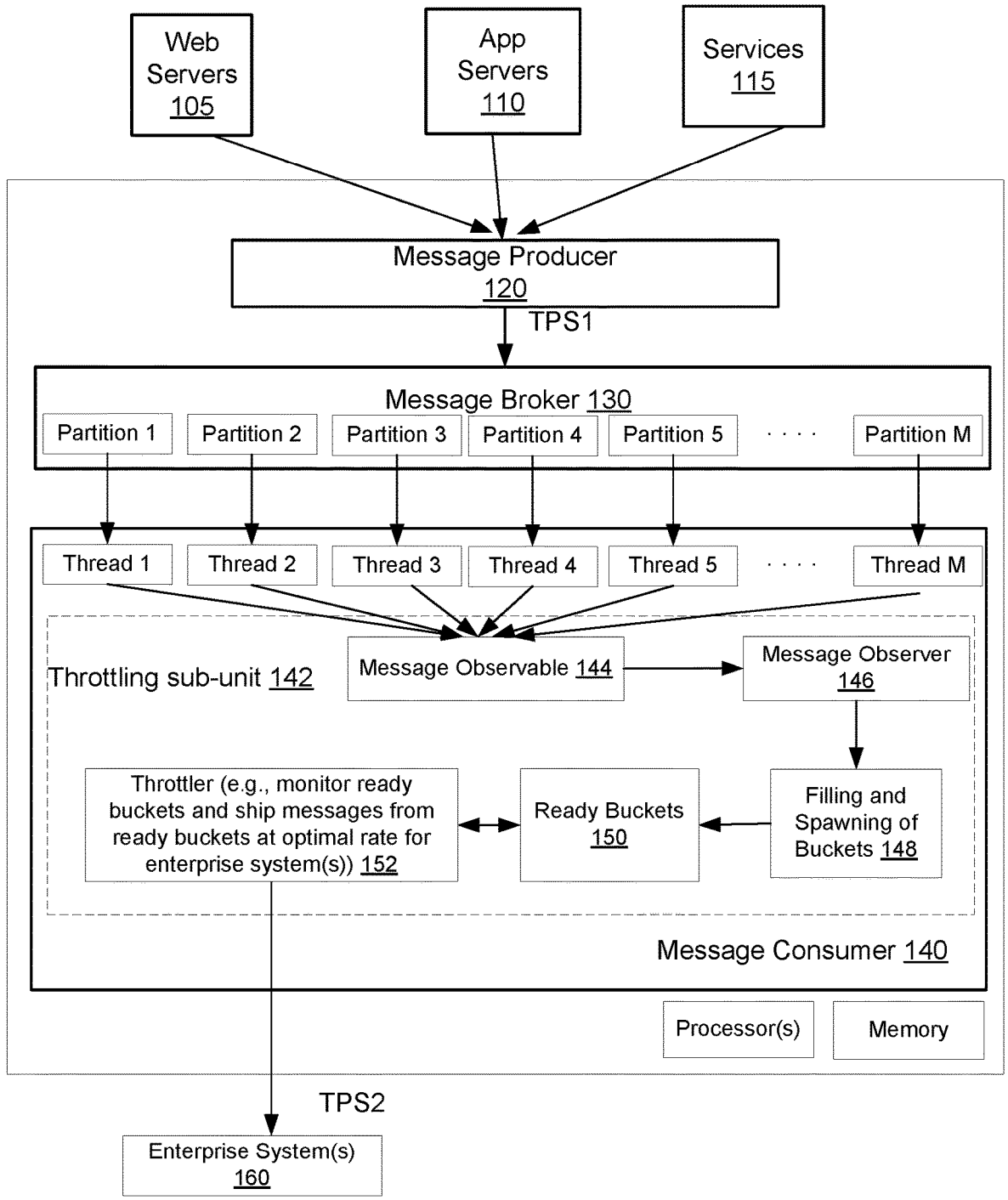
FIG. 1 illustrates a system in accordance with an embodiment of the disclosure.

FIG. 1 illustrates a system for throttling message traffic to an enterprise backend system 160. Inbound real time message streams are received by a message producer 120 from one or more message sources, such as web servers 105, application servers 110, and web or cloud services 115. This may result in a real time message stream having a first rate of transactions per second (TPS 1) for inbound traffic that at peak times is greater than an optimum rate of transactions per second (TPS 2) of outbound message traffic shipped to the enterprise backend system 160.

A fault tolerant message broker 130 brokers messages between the message producer 120 and the message consumer 140.

In one embodiment the message broker 130 is implemented as middleware running on one or more servers with associated processors, memory, and data storage. The message broker 130 is used to exchange messages between the message producer 120 and the message consumer 140.

In one embodiment, the message broker 130 is partitioned with a set of partitions (e.g., partitions 1, 2, 3, 4 . . . M) and the partitions may be assigned to different servers to form a distributed and partitioned fault tolerant message broker (not shown in FIG. 1). In one embodiment, each partition is implemented as a log having slots (e.g., slots 0, 1, 2, 3, 4, . . . M). In one embodiment, the distributed and partitioned broker is implemented with two or more servers configured to obtain a high throughput and fault tolerance with a high throughput relative to the inbound message stream traffic. For example, inbound traffic may be in the range of 100 transactions per second to 1500 transactions per second. In one embodiment, the message consumer 140 is a multi-threaded process with a consumer thread group listening for streaming messages from each partition. In some embodiments, consumer thread groups include configurable threads. These configurable threads may be assigned to a partition on the message broker 130. Due to the configurable nature of the threads in the thread group, high availability may be achieved by reassigning configurable threads to different/multiple partitions in the event that a thread fails or otherwise becomes unavailable.

In one embodiment, the message producer 120 is a process that publishes messages to the message broker 130 asynchronously. In one embodiment, the message producer publishes messages to the message broker at a very high throughput asynchronously. In one embodiment, the message consumer 140 receives messages from the message broker in random order.

In one embodiment the message producer, message consumer, and message broker are implemented with a Kafka® implementation and the message broker is implemented as a Kafka® broker cluster. Kafka® is a distributed streaming platform in which many components, such as producers and consumers, may be implemented in Java. Background information on Kafka® is published by the Apache Software Foundation. Kafka® includes a producer API to publish streams of records and a consumer API to subscribe to topics and process the stream of records.

Kafka® stores key-value messages which come from arbitrarily many in partitions within topics. Within each individual partition messages are ordered by their offsets (which is the position of a message within a partition) and indexed and stored together with a timestamp. Consumers can read messages from partitions. For stream processing, Kafka® offers the Streams API that allows writing Java applications that consume data from Kafka® and write results back to Kafka®.

Kafka® is designed to run on a cluster of one or more servers that are called brokers with the partitions of all topics being distributed across the cluster nodes. Additionally, in Kafka® the partitions are replicated to multiple brokers. An advantage of the Kafka® architecture is that it allows Kafka® to deliver streams of messages in a fault-tolerant manner. Additionally, a Kafka® broker functions as a storage layer.

However more generally it will be understood that embodiments of the disclosure are not limited to a Kafka® implementation. For example, a variety of messaging systems and message brokering system application provide some of the individual features of Kafka®. While the techniques introduced herein are described in relation to the features of Kafka® it should be understood that other messaging systems, such as RabbitMQ, ActiveMQ, MQSeries, etc., may be used.

In one embodiment, the message consumer includes a throttling sub-unit 142 that includes processes to regulate the rate of messages shipped to the enterprise backend system 160. In one embodiment, the throttling sub-unit 142 includes a message observable interface 144 that notifies the message observer 146 in an asynchronous manner that there are messages. Message observer 146 pushes the messages into fixed size buckets 148 of a bucket process such that received messages are accumulated into message buckets. A message bucket is a configurable dataset that acts as a temporary message storage container having a fixed storage size. In one embodiment, whenever a message bucket is filled, a new message bucket is spawned to hold more inbound messages. In one embodiment, a bucket is filled when the size of the message contents of the bucket reaches a threshold storage size value. In one embodiment, a bucket is marked as ready 150 when it is filled, thus generating a series of ready buckets. In one embodiment, the ready buckets are maintained in physical memory (e.g., RAM). The bucket may be an optimized data structure to utilize very little memory. The memory allocation for the process may be determined based on memory utilized by the consumer itself for processing and a number of anticipated buckets held in memory during peak times.

In one embodiment, a throttler 152 is implemented as a daemon process or a thread process that periodically monitors for ready buckets. The throttler 152 reads messages from the ready buckets 150. In one embodiment, the throttler 152 reads messages from each ready bucket one at a time, (i.e., reading one ready bucket before moving on to reading the next ready bucket and so on). The throttler 152 transforms the read messages from each bucket into message payloads understandable by the enterprise backend system 160 and then ships the payloads to the enterprise backend system. After a bucket is emptied, the bucket is terminated and the memory is freed up for future buckets. Consequently, in one embodiment a new bucket is spawned whenever a bucket is filled, ready (filled) buckets are read and shipped to the backend system according to the capacity of the backend system, and the process continues in a sequence with as many buckets being generated and stored by the throttling sub-unit 142 as necessary to handle incoming message traffic with the maximum rate that ready buckets are read and their contents shipped acting to throttle the outbound message traffic.

In one embodiment, the throttler 152 is configured to limit the message flow rate of outbound messages to the enterprise backend system 160 to a rate that the enterprise backend system can handle. That is, the throttler 152 processes the ready message buckets 150 up to a maximum rate that is optimal for the enterprise backend system 160. For example, the throttler 152 may have a selectable or programmable setting to limit the rate of reading ready buckets and shipping messages to the enterprise backend system 160. In one embodiment, the periodicity with which the throttler 152 monitors ready buckets is selectable, although more generally other parameters of the throttler 152 could also be selectable to regulate outbound traffic to safeguard the backend enterprise system. In some embodiments, the throttling sub-unit 142 may be configured to automatically detect throttling parameters based on performance of the enterprise backend system 160 and apply them to the throttler 152.

Figure 2:
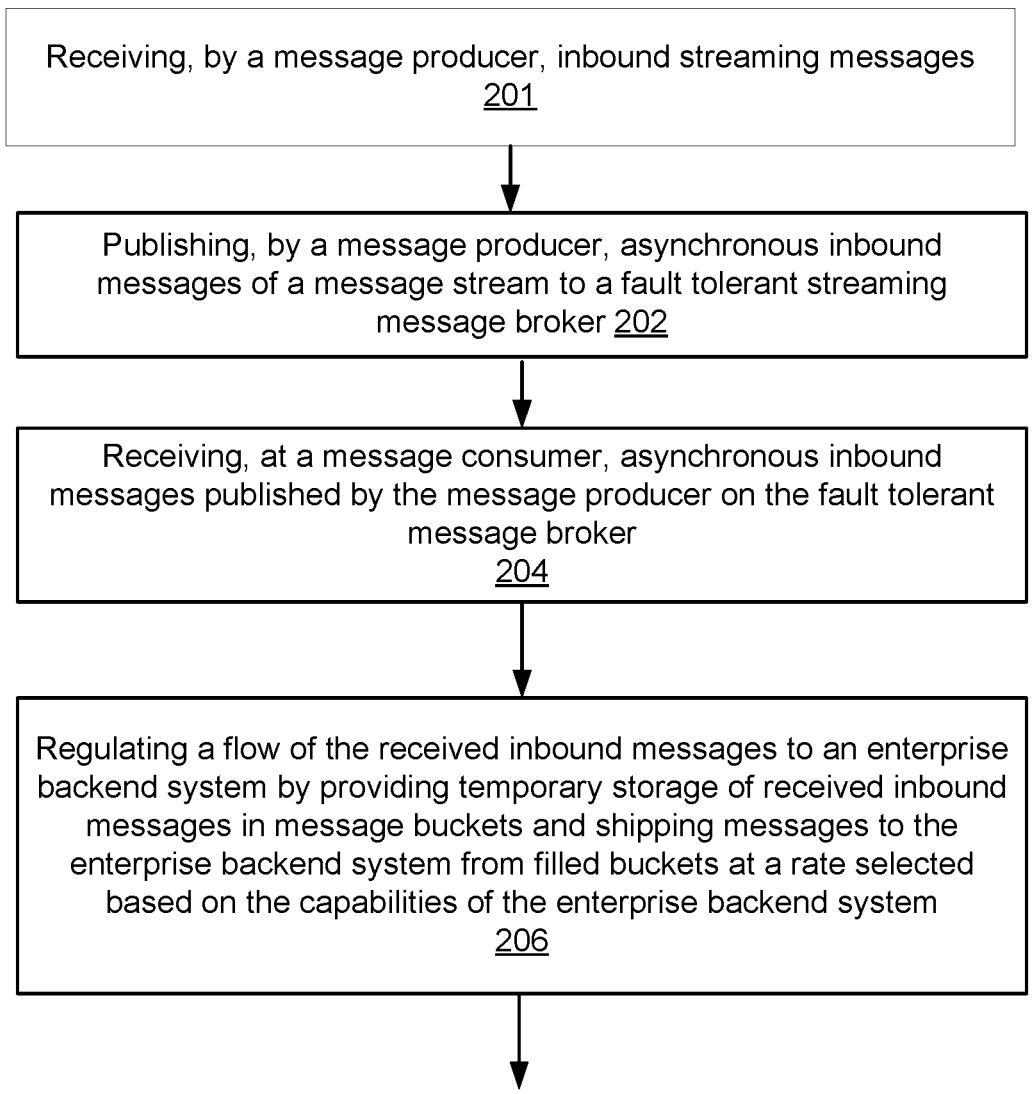
FIG. 2 is a flowchart of a general method in accordance with an embodiment of the disclosure.

FIG. 2 is a high-level flow chart of an embodiment of a method of this disclosure. In block 201, a message producer 120 receives inbound streaming message traffic. In block 202, the message producer 120 publishes a message stream asynchronously to fault tolerant message broker 130. In block 204, the message consumer 140 receives the inbound messages published by the message producer 120 on the fault tolerant message broker 130. In block 206, the message consumer 140 regulates a flow of the received inbound messages to an enterprise backend system 160 by providing temporary storage of received inbound messages in message buckets and shipping messages to the enterprise backend system 160 from filled buckets 150 at a rate selected based on the capabilities of the enterprise backend system.

Figure 3:
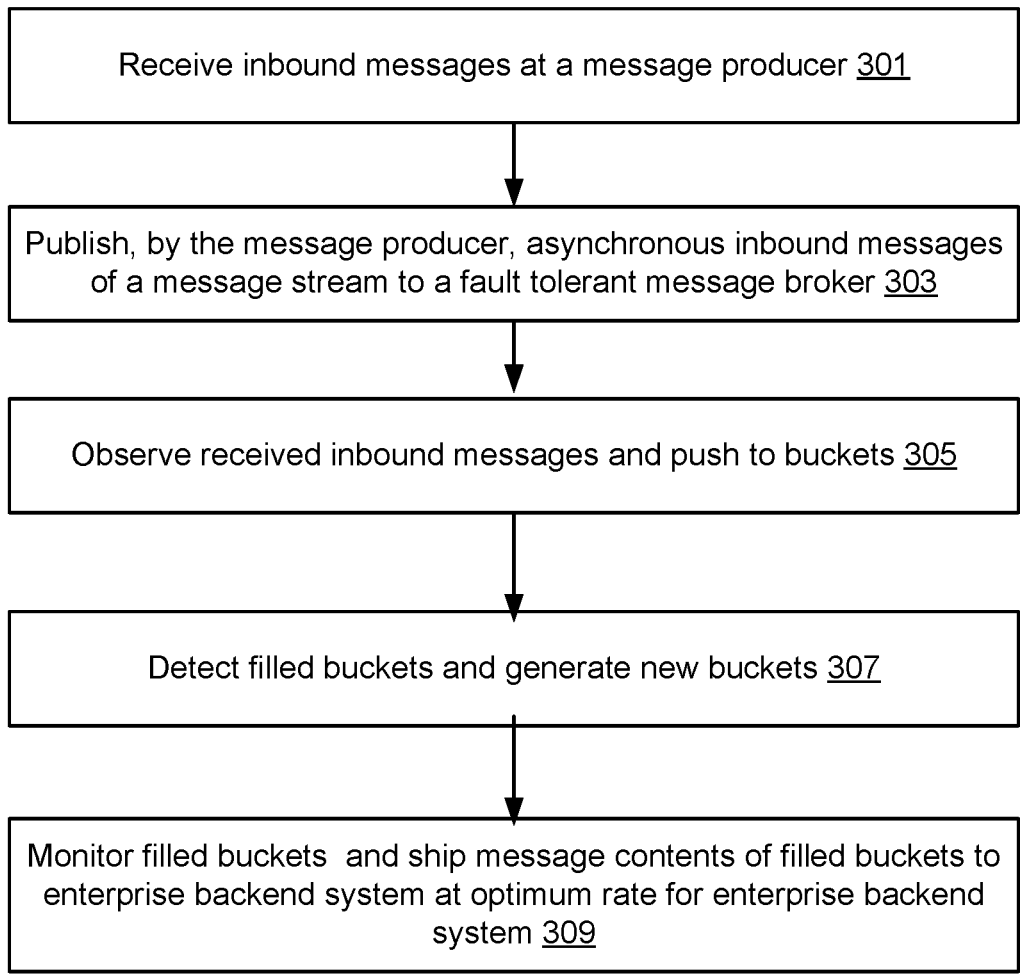
FIG. 3 is a flow chart of method in accordance with an embodiment of the disclosure.

FIG. 3 is another flow chart of an embodiment of this disclosure. In block 301, inbound messages are received by a message producer 120. In block 303, the message producer 120 publishes the inbound message stream asynchronously to a fault tolerant message broker 130. In block 305, the message consumer 140 observes the received inbound message of the message broker 130 and pushes the received messages to buckets. In block 307, the message consumer detects filled buckets 150 and generates new buckets when a bucket is filled. In block 309, the message consumer 140 monitors the filled buckets and ships the message contents of filled buckets to an enterprise backend system 160 at an optimal rate for the enterprise backend system.

Figure 4:
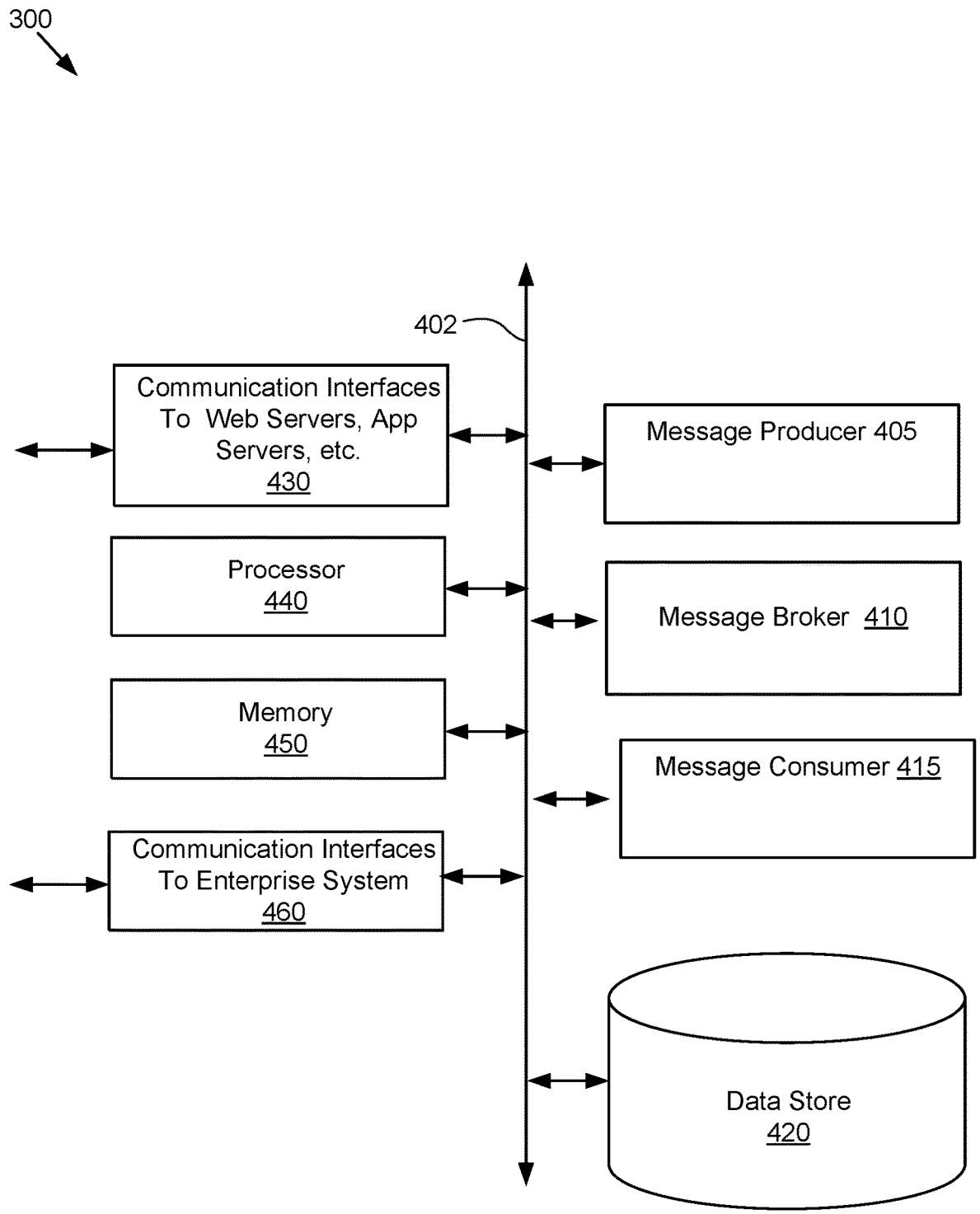
FIG. 4 is a block diagram of computer apparatus implementation in accordance with an embodiment of the disclosure.

FIG. 4 illustrates a general computing or server apparatus in accordance with an embodiment of the disclosure. In one embodiment, a bus 402 communicatively couples components together including a network communication interface 430, communication interfaces to enterprise systems, a memory 450, a processor 440, and a data store 420. The message producer 405 may be implemented as computer code instructions stored on a storage device. The message consumer 415 may also be implemented as computer code instructions stored in a storage device with additional storage for message buckets. The message broker 410 may be implemented as computer program instructions on a storage device with additional server support and storage allocated for the partitions.

Embodiments of the disclosure may be used to achieve various individual benefits of or a combination of benefits. Depending on implementation details, the backed enterprise system infrastructure is safeguarded from high peak traffic without requiring major infrastructure changes to the enterprise backend system. In some cases, this reduces infrastructure cost and, in some circumstances, may eliminate a need to make changes to a legacy backend enterprise system. Additionally, the approach is highly scalable.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method of managing streaming message traffic, comprising:
   publishing, by a message producer, inbound messages of a message stream to a fault tolerant message broker, the inbound messages received from a first interface with the message producer, wherein the fault tolerant message broker is distributed and partitioned;
   receiving, by a message consumer, the inbound messages from the fault tolerant message broker;
   observing, by the message consumer, received inbound messages and pushing the received inbound messages to a sequence of buckets, each bucket is a message container having an associated maximum threshold storage size value for storage of the received inbound messages, wherein a bucket of the sequence of buckets is filled when the bucket stores messages to the threshold storage size values;
   marking the buckets that are filled as ready buckets for transport to an enterprise backend system and maintaining the ready buckets in memory, wherein a new bucket is spawned in response to filling one of the sequence of buckets, and wherein the new bucket is allocated from memory anticipated to process the inbound messages during peak times;
   regulating, by the message consumer, a flow of the received inbound messages received over the first interface to a second interface with the enterprise backend system by:
   periodically identifying the ready buckets;
   monitoring the ready buckets; and
   making a decision to ship messages and shipping the messages from the ready buckets over the second interface to the enterprise backend system at a rate no greater than a maximum rate of the enterprise backend system, wherein the rate of shipping messages over the second interface to the enterprise backend system is independent of a rate of the inbound messages received over the first interface from the message producer.

2. The method of claim 1, wherein the message producer receives streaming messages from a front-end system including at least one of a web server, an application server, and a web service.

3. The method of claim 1, wherein the fault tolerant streaming message broker has a high throughput based on an inbound message traffic rate.

4. The method of claim 1, wherein the message consumer receives inbound messages in a random order.

5. The method of claim 1, further comprising: transforming messages from one of the ready buckets bucket into a message payload for the enterprise backend system; and shipping the message payload to the enterprise backend system.

6. A computer system, comprising: a plurality of servers with associated memory storage configured to implement distributed partitions of a message broker; at least one processor; and a memory storing computer program instructions which, when executed, cause the at least one processor to:
   publish, by a message producer, inbound messages of a message stream to a fault tolerant message broker, the inbound messages received from a first interface with the message producer, wherein the fault tolerant message broker is distributed and partitioned;
   receive, by a message consumer, inbound messages from the fault tolerant message broker;
   observe, by the message consumer, received inbound messages and pushing the received inbound messages to a sequence of buckets, each bucket is a message container having an associated maximum threshold storage size value for storage of the received inbound messages, wherein a bucket of the sequence of buckets is filled when the bucket stores messages to the threshold storage size values;
   mark the buckets that are filled as ready buckets for transport to an enterprise backend system and maintaining the ready buckets in memory, wherein a new bucket is spawned in response to filling one of the sequence of buckets, and wherein the new bucket is allocated from memory anticipated to process the inbound messages during peak times; and
   regulate, by the message consumer, a flow of the received inbound messages received over the first interface to a second interface with the enterprise backend system by periodically identify the ready buckets;
   monitor the ready buckets; and
   make a decision to ship messages and ship the messages from the ready buckets over the second interface to the enterprise backend system at a rate no greater than a maximum rate of the enterprise backend system, wherein the rate of shipping messages over the second interface to the enterprise backend system is independent of a rate of the inbound messages received over the first interface from the message producer.

\* \* \* \* \*